US012559918B2

(12) United States Patent
Mupende et al.

(10) Patent No.: US 12,559,918 B2
(45) Date of Patent: Feb. 24, 2026

(54) DEVICE FOR DETERMINING THE ACTUAL STATE AND/OR THE REMAINING SERVICE LIFE OF A CONSTRUCTION, MATERIALS-HANDLING AND/OR CONVEYOR MACHINE

(71) Applicant: Liebherr-Components Biberach GmbH, Biberach an der Riss (DE)

(72) Inventors: Yvon Ilaka Mupende, Neu-Ulm (DE); Jan Parlow, Oggelshausen (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 334 days.

(21) Appl. No.: 17/449,226

(22) Filed: Sep. 28, 2021

(65) Prior Publication Data

US 2022/0081880 A1      Mar. 17, 2022

Related U.S. Application Data

(63) Continuation of application No. PCT/EP2020/057924, filed on Mar. 23, 2020.

(30) Foreign Application Priority Data

Mar. 29, 2019    (DE) ..................... 10 2019 108 278.1

(51) Int. Cl.
E02F 9/26 (2006.01)
F16N 29/04 (2006.01)
(Continued)

(52) U.S. Cl.
CPC .............. E02F 9/267 (2013.01); F16N 29/04 (2013.01); G07C 5/006 (2013.01); G07C 5/008 (2013.01);
(Continued)

(58) Field of Classification Search
CPC ...... E02F 9/267; F16N 29/04; F16N 2200/10; F16N 2210/04; F16N 2250/08;
(Continued)

(56) References Cited

U.S. PATENT DOCUMENTS 5,132,920 A      7/1992 Bellows et al.
6,490,513 B1 * 12/2002 Fish ...................... H04L 9/3247
340/439

(Continued)

FOREIGN PATENT DOCUMENTS

CN          101373495          2/2009
CN          102539180          7/2012
(Continued)

*Primary Examiner* — Dale W Hilgendorf
*Assistant Examiner* — Frank T Glenn, III
(74) *Attorney, Agent, or Firm* — Levine Bagade Han LLP

(57) ABSTRACT

The invention relates to a device for determining the actual state and/or the remaining service life of a construction, materials-handling and/or conveyor machine, having a plurality of sensors provided on the construction, materials-handling and/or conveyor machine for recording various state information, a recording unit connected to the sensors for gathering the recorded state information, a central unit able to be connected to the recording unit for evaluating the gathered state information and determining the actual state and/or the remaining service life from the gathered state information, and a display device for displaying the determined actual state and/or the determined remaining service life, wherein the sensors comprise various sensor types for recording at least two different categories of information from the group comprising component oscillations, lubricant properties, component and/or lubricant temperature and drive loading and the central unit is designed to ascertain the actual state and/or the remaining service life on the basis of the at least two different categories of information.

29 Claims, 7 Drawing Sheets

(51) Int. Cl.
  *G07C 5/00*    (2006.01)
  *G07C 5/08*    (2006.01)

(52) U.S. Cl.
  CPC ........ *G07C 5/0825* (2013.01); *F16N 2200/10*
    (2013.01); *F16N 2210/04* (2013.01); *F16N*
          *2250/08* (2013.01)

(58) Field of Classification Search
  CPC ...... G07C 5/006; G07C 5/008; G07C 5/0825;
    G07C 5/0808; G01D 21/02; G06Q 10/04
  See application file for complete search history.

(56)     References Cited

U.S. PATENT DOCUMENTS

| | | | |
|---|---|---|---|
| 7,457,785 B1 | 11/2008 | Greitzer et al. | |
| 10,334,332 B1 * | 6/2019 | Poster .................... | G07C 5/008 |
| 10,956,003 B2 * | 3/2021 | Covington .......... | G06F 3/04842 |
| 2002/0013635 A1 | 1/2002 | Gotou et al. | |
| 2003/0028297 A1 * | 2/2003 | Iihoshi ................... | G07C 5/008 |
| | | | 701/29.6 |
| 2004/0177677 A1 * | 9/2004 | Heremans .......... | G01N 33/2888 |
| | | | 73/53.05 |
| 2006/0020402 A1 * | 1/2006 | Bischoff .................. | G01H 1/00 |
| | | | 702/34 |
| 2006/0276949 A1 | 12/2006 | Beck et al. | |
| 2007/0150317 A1 | 6/2007 | Dawson | |
| 2008/0140349 A1 | 6/2008 | Behera et al. | |
| 2010/0100338 A1 | 4/2010 | Vik et al. | |
| 2011/0169512 A1 * | 7/2011 | Hedges .............. | G01N 33/2888 |
| | | | 324/698 |
| 2011/0282626 A1 | 11/2011 | Rikkola et al. | |
| 2013/0180319 A1 * | 7/2013 | Klein-Hitpass ..... | G01M 13/028 |
| | | | 73/54.02 |
| 2013/0304896 A1 | 11/2013 | Collins et al. | |
| 2015/0105995 A1 * | 4/2015 | Leone .................... | F02D 41/04 |
| | | | 701/102 |
| 2016/0054288 A1 * | 2/2016 | O'Donnell ............. | G01N 33/30 |
| | | | 702/22 |
| 2016/0266006 A1 | 9/2016 | McKimpson et al. | |
| 2017/0122792 A1 | 5/2017 | Tejeda et al. | |
| 2018/0010320 A1 * | 1/2018 | Yoshikawa .......... | B62D 11/003 |
| 2018/0018641 A1 * | 1/2018 | Jussel ..................... | G07C 3/00 |
| 2020/0157479 A1 * | 5/2020 | Nunes Nogueira .... | C12M 41/44 |
| 2021/0312335 A1 * | 10/2021 | Deichmann ........ | G05B 23/0281 |

FOREIGN PATENT DOCUMENTS

| | | | | |
|---|---|---|---|---|
| CN | 103003801 | | 3/2013 | |
| CN | 107238407 A | * | 10/2017 | ............ G06Q 50/06 |
| CN | 108027358 | | 5/2018 | |
| DE | 10145571 | | 3/2002 | |
| EP | 1564688 | | 8/2005 | |
| EP | 1724730 | | 11/2006 | |
| EP | 2530209 | | 12/2012 | |
| EP | 2759826 | | 7/2014 | |
| EP | 3236326 | | 10/2017 | |
| EP | 3273414 | | 1/2018 | |
| JP | H08-144312 | | 6/1996 | |
| JP | 2004-211884 | | 7/2004 | |
| JP | 2005-233789 | | 9/2005 | |
| JP | 2014-163047 | | 9/2014 | |
| JP | 2016-113819 | | 6/2016 | |
| JP | 2018-014092 | | 1/2018 | |
| JP | 2019-152632 | | 9/2019 | |
| WO | WO-2013017287 A1 | * | 2/2013 | ............ G06Q 10/08 |
| WO | WO 2019/021502 | | 1/2019 | |
| WO | WO 2020/200863 | | 10/2020 | |

* cited by examiner

CMSG Module 4

CMSG Module 2

CMSG Cockpit

CMSG Module 3

CMSG Module 1

CMSG Slave station

CMSG Data processing

CMSG Master station

DEVICE FOR DETERMINING THE ACTUAL STATE AND/OR THE REMAINING SERVICE LIFE OF A CONSTRUCTION, MATERIALS-HANDLING AND/OR CONVEYOR MACHINE

CROSS-REFERENCE TO RELATED APPLICATIONS

This application is a continuation of International Patent Application Number PCT/EP2020/057924 filed Mar. 23, 2020, which claims priority to German Patent Application Number DE 10 2019 108 278.1 filed Mar. 29, 2019, the contents of which are incorporated herein by reference in their entireties.

BACKGROUND

The present invention relates to a device for determining the actual state and/or the remaining service life of a construction, materials-handling and/or conveyor machine, having a plurality of sensors provided on the construction, materials-handling and/or conveyor machine for recording various state information, a recording unit connected to the sensors for gathering the recorded state information, a central unit able to be connected to the recording unit for evaluating the gathered state information to determine the actual state and/or the remaining service life from the gathered state information, and a display device for displaying the determined actual state and/or the determined remaining service life.

For construction machines such as excavators, cranes, dump trucks, dozers, bulldozers or rope excavators, or materials-handling machines or conveyor machines such as forklifts and loaders, or other larger work machines such as surface milling machines or ship cranes, it is equally important and difficult to predict the remaining service life or the remaining time before a component of the construction machinery needs to be replaced. If a construction, materials-handling and/or conveyor machine fails during operation on a construction site, for example due to the failure of a drive gear, it is often not possible to immediately obtain a suitable replacement machine and deliver it to the construction site, causing delays on the construction site during the repair time required for the repair, while often not only the tasks of the failed construction machinery themselves remain undone, but other processes also encounter delays due to the inter-linked operations of various construction machinery. In order to avoid such failure situations of a construction machine, the operational planning requires a reliable deter-mination of the actual state or the remaining service life of a respective machine in order to be able to estimate whether the respective construction machine will withstand the work cycle of a construction site or needs to be serviced before-hand.

However, it is very difficult to reliably estimate the actual state or the remaining service life of a construction machine, as the loads and operating conditions vary considerably between different construction sites. For example, earth-moving machines are subjected to much higher loads when hard rock has to be moved at the construction site. Likewise, construction machinery such as dump trucks or bulldozers are loaded differently on slopes than on flat construction sites. In general, different construction sites lead to very different loads, which makes it difficult to estimate whether the remaining service life of a construction machine is sufficient for a specific construction site. In addition, construction machinery also has very different load histories. If, for example, a construction machine happens to have always been used on construction sites with heavy loads, the usual estimates of the remaining service life based on operating hours cannot reliably predict the remaining service life.

Therefore, there have already been proposals for sensory surveillance systems for construction machinery, which are intended to render the determination of the actual states of construction machinery more objective on the basis of the measured sensor data. In this regard, it is known, for example, to monitor certain operating parameters of the construction machinery and to output an error code in the event of irregularities or unusual values of the measured operating parameters, cf., for example, JP-OS-8-144 312. Nevertheless, such fault codes are not as such very mean-ingful or reliable, since, for example, briefly exceeding a permissible speed, as can occur, for example, when driving downhill in a construction site access road, does not yet allow a reliable statement to be made about engine damage caused as a result.

The document DE 101 45 571 A1 of the Applicant Komatsu also proposes a surveillance system for construc-tion machines which aims to predict the degree of damage or abnormality in a more differentiated manner. In this respect, on the one hand the exhaust gas pressure and the exhaust gas temperature of the construction machinery fuel are monitored by sensors, and on the other hand the lubri-cating oil is analyzed for certain components such as iron particles by means of a special analysis device. In addition to these sensory monitoring variables, however, said prior art document still considers it necessary to include the result of a visual inspection carried out by an experienced main-tenance person in the automated assessment of the actual state of the construction machine. On the one hand, this previously known surveillance system for construction machinery suffers from a limited reliability of the state information. Due to the monitored exhaust gas variables exhaust gas temperature and exhaust gas pressure, mainly only problems on the diesel can be determined. On the other hand, the surveillance system is still relatively costly, as visual inspections have to be carried out by maintenance staff.

It is therefore the underlying object of the present inven-tion to provide an improved device for determining the actual state and/or the remaining service life of a construc-tion, materials-handling and/or conveyor machine, which avoids disadvantages of the prior art and develops the latter in an advantageous manner. In particular, the aim is to achieve a reliable determination of the actual state and/or remaining service life that is easy to implement on mobile construction machinery and enables maintenance and repair measures to be taken and planned in good time, even by a non-trained maintenance person, with a sufficient lead time.

Said task is solved, according to the invention, by a device as claimed in claim 1. Preferred embodiments of the inven-tion are the subject-matter of the dependent claims.

SUMMARY

Thus, in accordance with one aspect of the present inven-tion, it is proposed that the sensory surveillance of the respective construction machine by different sensor types be sufficiently broad to carry a complex estimation of the actual state or remaining service life. In this case, the sensors provided on the construction, materials-handling and/or conveyor machine comprise different sensor types for recording at least two different information types selected from the group consisting of component oscillations, lubricant properties, component and/or lubricant temperatures and drive loading, the central unit of the device being designed to determine the actual state and/or the remaining service life on the basis of the at least two different information types. The information types mentioned specifically reflect the actual state relevant for the remaining service life. Component oscillations are characteristic of untrue running of the drives, which may be implied by component wear, abrasion or improper use and always deviates from the preset reference oscillation pattern when the machine shows wear. Lubricant properties are also a meaningful indicator of both load history as well as the remaining service life. Component or lubricant temperatures increase significantly due to excessive loads and excessive wear of the components lubricated with them and therefore also form a reliable indicator of the actual state and the remaining service life. Said drive loadings, such as speed and torque sensor, characterize the load cycles acting on the machine and therefore also allow the remaining service life to be predicted.

Advantageously, recorded information of all the categories of information specified hereinabove can be used for the prediction of the remaining life.

In further embodiments of the invention, said sensor system may comprise oscillation sensors on various components and/or component sections, in particular on a drive housing and/or a transmission housing and/or another element of the drive train. Said oscillation sensors can be working piezoelectrically and/or comprise electro-mechanical oscillation sensors.

For recording said lubricant properties, there may be advantageously provided various sensors, wherein, in further developments of the invention, first of all provision may be made for an oil level sensor in order to record the lubricant level in a lubricant sump of a drive component, in particular a transmission. Such a lubricant sensor can comprise a float and/or determine the level tactilely or mechanically. Alternatively or additionally, provision can also be made for a capacitive lubricant level sensor.

Advantageously, the lubricant recording system may further comprise a moisture sensor in the lubricant chamber of the construction machine to record moisture in the lubricant and/or to record moisture in the lubricant chamber.

Alternatively or additionally, the lubricant sensors may comprise a conductivity sensor, which may be arranged in the lubricant chamber and/or in the lubricant.

Further alternatively or additionally, provision can also be made for a temperature sensor as a lubricant sensor for recording the lubricant temperature, wherein such a lubricant temperature sensor may be arranged in the lubricant sump. Alternatively or additionally, the lubricant temperature can also be recorded indirectly, for example by recording the temperature of a housing part wall delimiting the lubricant sump.

Advantageously, the sensor system not only records the temperature of the lubricant, but can also consist of further temperature sensors by means of which the temperature of further thermally loaded components is recorded, for example the temperature of bearings.

Advantageously, the drive loading can be recorded by a speed sensor and/or a torque sensor to record a speed of a shaft of the drive train, in particular a transmission input shaft and/or other transmission shafts, and/or to determine the torque applied to a shaft of the drive train. For example, the input shaft of the transmission or another transmission shaft may be monitored by a torque sensor to determine the torque applied to the input shaft or another transmission shaft. Such a torque sensor may be of various types, for example comprising a strain gauge and/or a distance sensor for recording deformations and/or a sensor determining inverse magnetostrictive effects.

In advantageous further developments of the invention, at least one sensor or all sensors may be integrated into the component of the construction machine to be monitored, in particular accommodated in an interior space. Alternatively or additionally, however, the arrangement of one or more sensors may be provided on an outer side of the construction component and/or in the immediate vicinity of the construction component and/or the construction machine.

Advantageously, said sensors may be connected by a cable to said recording unit which gathers the recorded state information. Alternatively or additionally, however, the sensors can also communicate wirelessly with the recording unit, in particular transmit the recorded information, for example, via a WLAN, ZigBee, Bluetooth or other wireless connection.

Advantageously, at least one of said sensors may be supplied with power or energy from said recording unit. This can be achieved in a simple manner, especially if the sensors are connected to the recording unit via cables.

In principle, the sensor technology mentioned can be used to monitor various construction machine components in a corresponding manner and to determine their actual state or remaining service life. In order to be able to reliably determine the actual state or the probability of failure of the entire construction machine, it is helpful to monitor a relevant construction machine component that is meaningful in this respect. According to another aspect of the present invention, said sensor system monitors a transmission of the construction machine through which drive power is transmitted from a drive device to a construction machine component to be driven. In particular, at least one or even all of the sensors may be integrated in said transmission, in particular arranged in the interior of said transmission, in order to record said state information inside said transmission.

If the aforementioned state information is recorded on a transmission, it is thus provided that transmission vibrations and/or transmission lubricant properties and/or transmission temperatures and/or transmission loads are recorded and the central unit determines the actual state and/or the remaining service life on the basis of at least one of said transmission information items. In this respect, said properties can be monitored on one or also on a plurality of transmissions of the construction machine and used to determine the actual state and/or the remaining service life. A transmission is a key component of the drive train, where the effects of wear and damage can be seen in a characteristic way, so that monitoring of the construction machinery transmission is meaningful for determining the actual state and/or remaining service life.

Depending on the construction machine, such a transmission can be used in different places. For example, it may be a travel drive transmission used to drive a construction equipment travel drive, such as a crawler chain or landing gear wheel. Alternatively or additionally, a slewing gear transmission may be monitored in the aforementioned manner, by means of which a superstructure of the construction machine may be rotated about an upright axis relative to the undercarriage of the equipment or relative to the support base. For example, this may be the superstructure of a hydraulic excavator or a telescopic mobile crane or a derrick crane. Alternatively or additionally, however, the slewing gear of a revolving tower crane can also be monitored, by means of which the tower can be slewed in the event of a top slewing and the tower can be slewed in the event of a bottom slewing.

Alternatively or additionally, other transmissions of a construction machine, such as the hoist transmission of a hoist, can also be monitored in the aforementioned manner.

Said recording unit, which is connected to the sensors and gathers their information, can advantageously be supplied with power or energy by the construction machine. For this purpose, said recording unit may have an energy connection adapted to the energy network of the construction machine.

Advantageously, said recording unit may be arranged directly on the construction machine, for example forming part of the electronic control device of the construction machine and/or forming a separate electronic construction machine component. Said recording unit may, for example, comprise a microprocessor and a memory device in order to be able to process program blocks stored in the memory and/or to temporarily store the gathered data in the memory device.

Advantageously, said recording unit may comprise a power or current supply device to provide power or current to the sensors.

Independently of such a power supply device, however, said recording unit can also be designed separately from the construction machine, in particular be set up in the construction machine environment, for example the construction site, whereby in such a separate design both a cable connection and a wireless connection to the sensors can be considered.

Advantageously, said recording unit has at least one digital communication interface, wherein such a digital interface may comprise, for example, a CAN interface, an Ethernet interface, a Modbus interface, a serial interface, a mobile radio interface, a WLAN interface and/or a Bluetooth interface. Advantageously, the recording unit can be connected to and/or communicate with said central unit via the aforementioned digital interface. Where appropriate, said digital interface may also be used to communicate with one or more sensors.

Advantageously, said recording unit has a unique identifier that identifies the construction machine to which the recording unit is connected. Such an identifier may be designed to be readable and/or electronically retrievable and/or electronically readable, wherein the recording unit may also transmit said identifier together with other data to the central unit, in particular together with the gathered state information.

According to another aspect of the present invention, said recording unit is not a pure data or information collector, but is adapted to pre-process and/or classify the gathered information provided by the sensors. In particular, the recording unit may comprise a module for pre-summarizing data and/or classifying the gathered data in order to be able to transmit pre-summarized and/or classified state information to the central unit.

In particular, the recording unit may be adapted to derive oscillation spectra and/or characteristic oscillation values from the gathered oscillation information and/or to form frequency-selective characteristic values.

Alternatively or additionally, the recording unit may comprise a device which classifies the recorded torque information and/or speed information, in particular classifies it stepwise, for example with respect to a load-time distribution.

Alternatively or additionally, the recording unit may comprise a linking and/or accounting unit to account for sensor data with each other. For example, gathered temperature values can be compared with one another and/or temperature differences can be determined. Alternatively or additionally, powers can be calculated from speed and torque in order to be able to pass on to the central unit the information thus adjusted and/or calculated and obtained from the gathered sensor data.

Alternatively or additionally, the recording unit can be designed to derive and determine further characteristic values from the gathered sensor data, for example to calculate an output torque from the input torque, by means of a transmission ratio of the transmission including an efficiency map.

In an advantageous further embodiment of the invention, the recording unit may have access to and/or include a configuration memory in which central data relating to the construction machine component is stored, for example operating hours, serial number, number of stages, efficiency map, heat transfer coefficients, limit values and similar.

In an advantageous further embodiment of the invention, said recording unit has a self-diagnostic device which determines the own operating status of the recording unit, for example the on/off state of the device and/or an active or inactive or defective state of a connected sensor.

Said central unit can, for example, be set up on the construction site on which the construction machine is operated. For example, it may be combined with or formed by a site control computer. In an alternative further development of the invention, however, said central unit can also be set up at a location separate from the construction site, for example at a construction machine manufacturer or construction machine operator. Said central unit can also be implemented in a cloud, whereas, for example, a machine provider can also provide a sub-area of a commercial cloud or use its own cloud solution. On the other hand, in an advantageous further embodiment of the invention, the central unit may also be installed on the construction machine itself.

In order to be able to communicate with said recording unit or also several recording units, which may be associated with one or different construction machines, and the display device, said central unit may comprise one or more communication interfaces, preferably one or more digital interfaces, for example in the form of a CAN interface, Ethernet interface, Modbus interface, serial interface, mobile radio interface, WLAN interface or Bluetooth interface.

Advantageously, the central processing unit may also comprise an interface, which may be configured in the aforementioned manner, for programming and/or maintaining and/or reading the determined identification and/or status and/or remaining service life data.

In further aspects of the invention, said central unit consists of an analysis module for analyzing the state information gathered by the recording unit and/or for analyzing the pre-processed state information transmitted by the recording unit, which may comprise, for example, the pre-compressed and/or classified information previously explained. In particular, said analysis module of the central processing unit may also be adapted to analyze the state information pre-processed by the recording unit, for example in the form of oscillation spectra and/or characteristic oscillation values and/or frequency-selective characteristic values. Alternatively or additionally, the analysis module can also further process the information derived from the recording unit, for example the temperature differences determined by the recording unit, power values determined from speed and torque, and/or the output and/or input torques determined by the recording unit.

In advantageous further embodiments of the invention, the analysis process may thus be of a two-step design, with a pre-processing and/or analysis step being performed in the recording unit and a second analysis step then being performed in the central unit.

In a further development of the invention, the analysis module of the recording unit can thereby combine both pre-processed state information which has been pre-processed by the recording unit in the aforementioned manner and gathered sensor data which has not been further processed by the recording unit and/or determine the actual state and/or the remaining service life of the construction machine and/or one of the construction machine components on the basis of both types of data.

Advantageously, in order to be able to determine a maintenance requirement in a timely manner with sufficient lead time for repair planning, the central unit may comprise a trend determination module which determines a trend followed by the change in said state information and/or the information derived therefrom, in order to be able to estimate more precisely from this trend an expected change in the actual state and/or the remaining service life.

Alternatively or in addition to such a trend determination module, the central unit advantageously comprises a comparison device which compares the transmitted state information and/or the information derived therefrom with limit values and/or predetermined ranges and determines the actual state and/or the remaining service life of said construction machine or said construction machine part from the distance of the actual values of said data from the limit values and/or the range limits and/or an exceeding of said limit values.

In an advantageous further embodiment of the invention, the central unit may thereby comprise a weighting device which assigns an individual weight or weighting to the individual state information and/or the information derived therefrom and/or the respective distance of such information from the associated limit value and/or the associated range limit, so that, for example, a vibration characteristic value is taken into account more strongly than a temperature value of the oil sump housing with respect to the determination of the remaining service life.

Said weighting means may also give a different weighting to the trend of changes in state information determined by the trend determining means, wherein such weighting may in particular be assigned or determined based on the strength of the trend. For example, if the trend of the oscillation values shows a very large change and the trend of a temperature parameter shows only a small change, the trend of the vibration parameter can be weighted more heavily to determine a greater reduction in remaining service life. Such a strong, meaningful trend can be interpreted as a sign that the component associated with the respective state information is experiencing greater wear and will soon fail.

In a further embodiment of the invention, the central unit may also comprise a dynamic assessment device by means of which the approximation of one or more pieces of state information to a threshold value and/or one or more trends are not always taken into account in the determination of the actual state and/or the remaining service life, but are taken into account dynamically. If, for example, a recorded state information exceeds a predetermined threshold value only slightly, for example by 5%, but all other state information is still on the good side of the respective threshold values, said 5% exceeding of the one threshold value can still be regarded as unproblematic. If, however, three recorded status information items are, for example, 4%, 3% and 1.5% beyond the respective threshold value, this can trigger a maintenance signal, even if the above-mentioned excess tolerance of 5% would not be relevant for an individual exceeding.

The determination of the remaining service life or a service life prognosis can be calculated by said central unit on the basis of calculation models, wherein advantageously both the currently gathered state information and an operating history of the construction machine and/or the construction machine component can be taken into account, in particular also in a parameterized form.

In particular, for example, said computational model may be fed with operational history data to determine the magnitude of deviations that one or more pieces of state information have exhibited in the operational history. This allows permissible threshold values to be scaled. For example, if the operating history shows that a gathered oscillation values has deviated 40% upward and/or downward from a mean value during the period for which data was gathered, a deviation of 50% or 60% may be considered critical. If a currently gathered data set of the corresponding state information is then fed into the computational model, a critical state can be assumed if the scaled deviation is exceeded.

In a further embodiment of the invention, the central unit for a mechanical construction machine component can determine, in particular calculate, a damage according to predetermined determination rules, wherein strength values of materials used and/or standard values according to literature can be used as a basis.

For a monitored lubricant, the central unit can use a thermal damage model as a basis for converting a gathered temperature history of the lubricant into a thermal damage of the lubricant. If an oil change is carried out, the temperature history or the achieved damage of the lubricant can be reset.

Said central unit may be an electronic computing device or electronic data processing device which may, for example, comprise one or more processors, a program memory and/or a data memory in order to be able to process predetermined program modules. For example, said central unit may be in the form of a server.

In a further embodiment of the invention, provision is made for a memory unit which can be connected to said central unit permanently or temporarily by cable or wirelessly, for example via a corresponding communication interface which grants the central unit access to the memory unit, for example in the form of a CAN interface, Ethernet interface, Modbus interface, serial interface, mobile radio interface, WLAN interface or Bluetooth interface.

Said memory unit may be arranged separately from the central unit, or it may be integrated directly into the central unit.

Advantageously, said memory unit is configured to store both currently gathered data and history of the data or other data. The memory unit may include separate memory areas for actual data and for data history.

In this context, sensor raw data that has remained unprocessed by the recording unit and the central unit can be stored as actual data and/or as history of the data, as well as processed data that has been calculated or otherwise determined by the recording unit and/or the central unit. In particular, said trend data and/or remaining service life data and/or actual state data may also be stored in the central unit.

Said memory unit may be implemented on a locally installed computer, such as a server, which includes the central unit. Alternatively or additionally, said memory unit may also be implemented in a cloud.

Said display device for displaying the determined actual state and/or the determined remaining service life can in principle be of different types.

Advantageously, said display device has a communication interface for communicating with said central unit and/or with said memory unit in order to display data determined by the central unit, in particular the determined remaining service life and/or the determined actual state, and/or to display data stored in the memory unit, in particular an actual state and/or remaining service life stored therein.

Said interface of the display device may comprise a digital interface similar to that previously explained, for example a CAN interface, Ethernet interface, Modbus interface, serial interface, cellular interface, WLAN interface or Bluetooth interface.

Advantageously, said display device may be provided on the construction machine to display to a machine operator on the construction machine the corresponding data, in particular the determined actual state and/or the determined remaining service life. Alternatively or additionally, said display device may be provided in a control station at the machine operator and/or at the machine manufacturer to display the corresponding data to the machine operator and/or the machine manufacturer.

In particular, said display device may comprise at least one display on which said data, in particular the determined actual state and/or the determined remaining life and/or the condition history and/or trend data and/or forecast data, may be displayed.

Such a display is advantageously provided on the construction machine, in particular in the machine operator's station. Alternatively or additionally, a display can also be provided in the central control station at the machine operator and/or the machine manufacturer.

In an advantageous further embodiment of the invention, said display device may be configured to generate warning messages as soon as the construction machine and/or at least one construction machine component is operated outside its operating specification and/or limit values are overshot and/or undershot, and/or a service life prediction falls below a certain remaining time.

Advantageously, the display device may have a user management system that allows configuring the way of displaying data and/or defining access rights to specific data.

Advantageously, the display device may also be configured to display an overview and individual data from a plurality of central units and/or a plurality of memory units to enable fleet management.

BRIEF DESCRIPTION OF THE DRAWINGS

The invention is explained in more detail below on the basis of a preferred exemplary embodiment and the corresponding drawings. The drawings show.

1 and its slewing gear and travel drive transmissions, wherein the connection of the transmission sensors to a recording unit, the central unit connected thereto for evaluating the data and the memory units and visualisation units connected thereto are shown in turn.

DETAILED DESCRIPTION

Figure 1:
FIG. 1: a schematic representation of a construction, materials-handling and/or conveyor machine in the form of a crawler excavator with a slewing gear transmission and a travel drive transmission, the actual state and remaining service life of which are determined by a device according to an advantageous embodiment of the invention by monitoring the two transmissions by means of sensors.

As FIG. 1 shows, for example, a construction machine 1 in the form of a crawler excavator can be monitored, wherein in particular one or more transmissions can be monitored by sensors. For example, a travel drive transmission 3 and a slewing gear transmission 2 can be monitored. As FIG. 1 illustrates, the travel drive transmission 3 can, for example, drive the chain drive tumbler and the slewing gear 2 can rotate the slewing platform 4, said slewing platform 4 being rotatably mounted about an upright axis on the undercarriage 5, which has the travel drive. A driver's cab 6, a jointed boom 7 and further drives and counterweights and other construction machine components may be accommodated on the rotating platform 4 in a conventional manner.

As FIG. 1 shows, other components of the construction machine 1 relevant to service life can also be monitored by sensors as an alternative or in addition to the transmissions 2 and 3 specified, for example the drive motor 8 of the slewing gear and/or a luffing actuator 9 for luffing the boom 7 up and down, for example in the form of a pressure medium cylinder.

As FIG. 1 further shows, the gathered sensor data can be transmitted wirelessly to a central unit via a transmitter module, as will be explained later.

Figure 2:
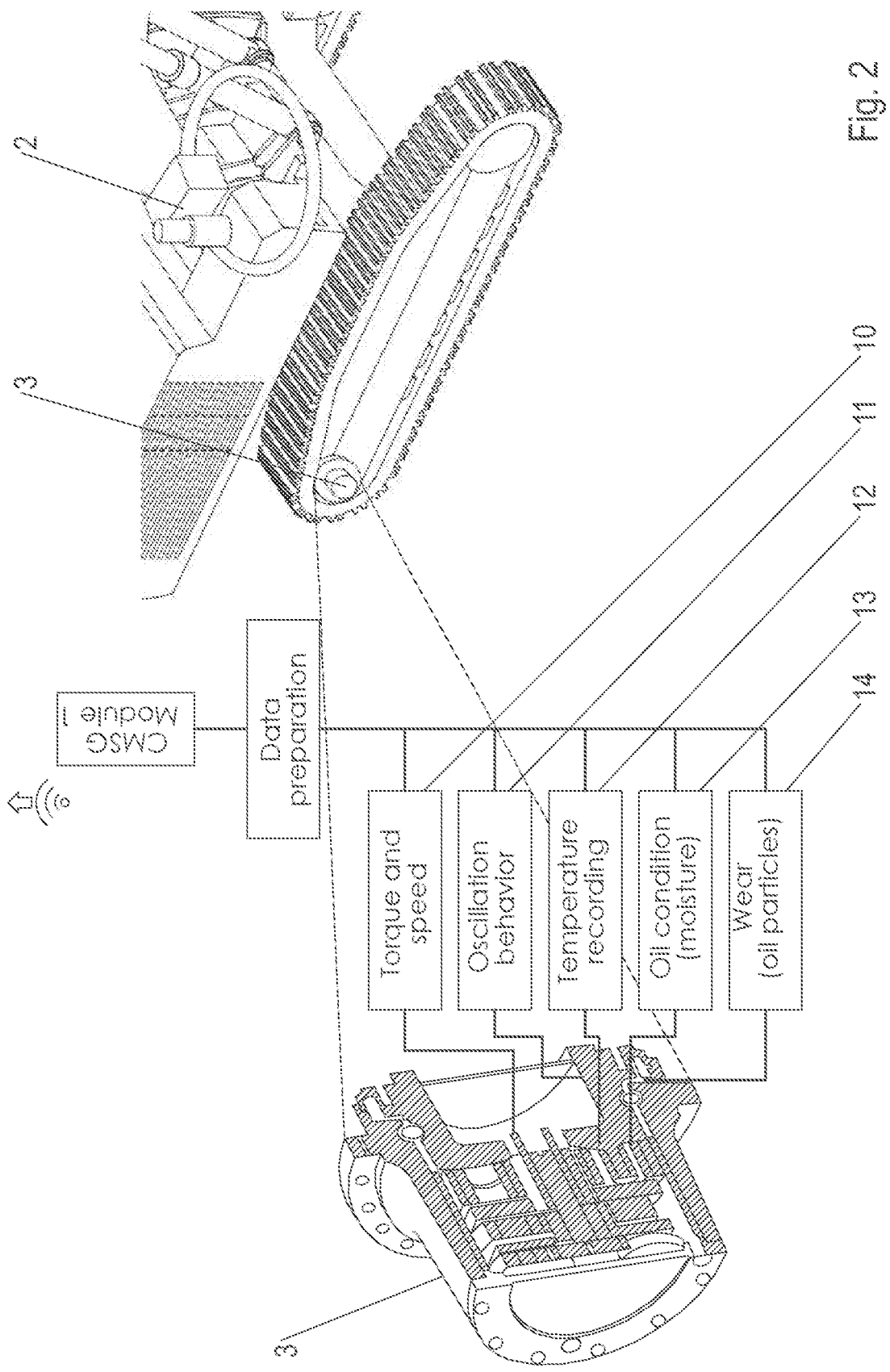
FIG. 2: a schematic representation of the sensors integrated in the travel drive transmission for recording certain status information.

As FIG. 2 shows, various sensors can be integrated into the construction machine component to be monitored, in particular one of the transmissions 3, in particular arranged in an interior space enclosed by a component housing, in order to record relevant state information.

In particular, the transmission 3 may have associated therewith a torque sensor 10, a speed sensor 11, a temperature sensor 12 for recording the transmission oil temperature and/or the temperature of another transmission component, an oil condition sensor 13 particularly for recording moisture in the oil or oil chamber, and an oil particle sensor 14 for recording particles such as metal chips in the oil.

Figure 3:
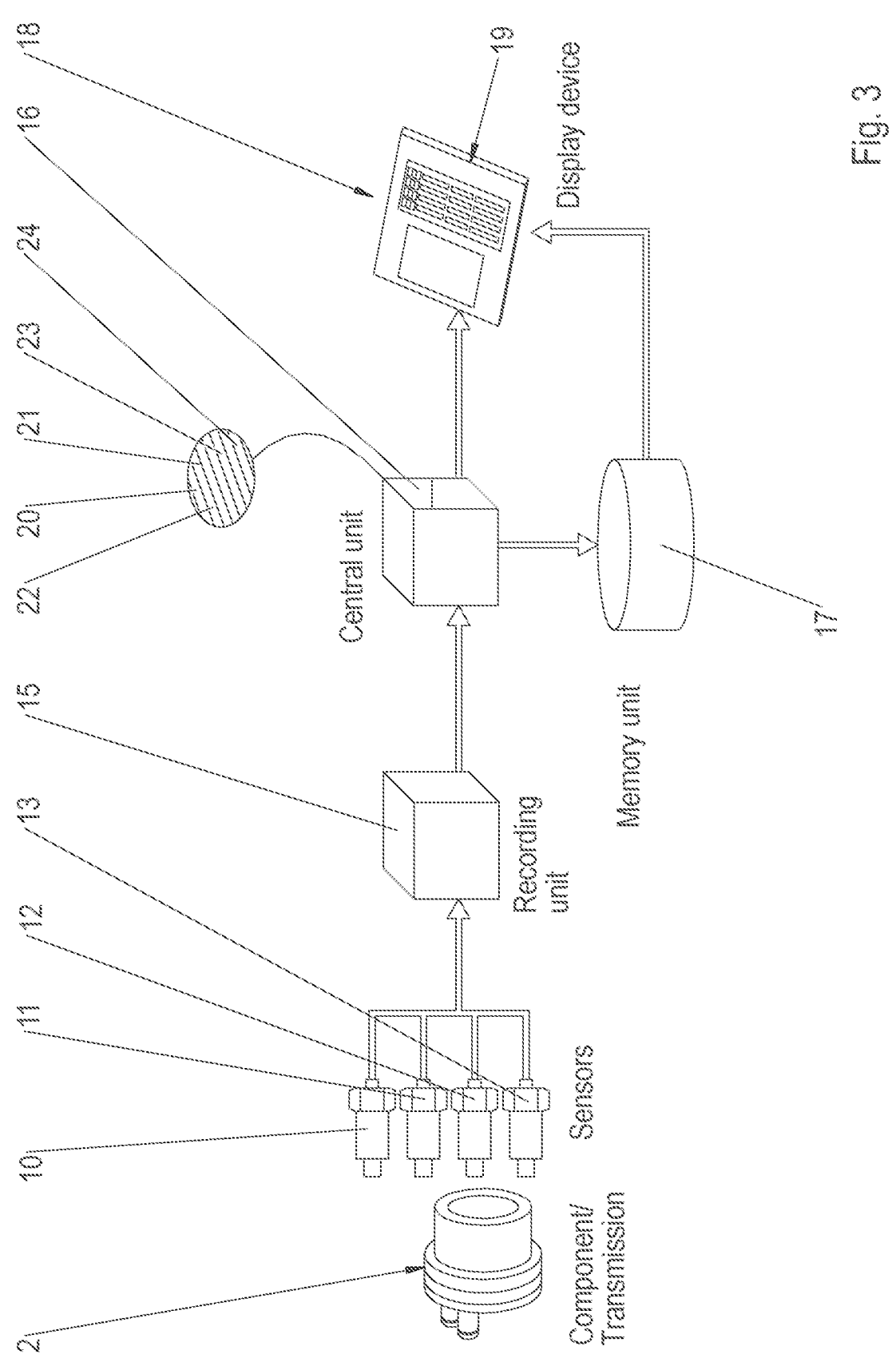
FIG. 3: A schematic representation of the overall structure of the device for determining the actual state and the remaining service life of the construction machine from FIG.

As FIG. 3 shows, the state information recorded by the various sensors 10 to 14 is transmitted to a recording unit 15, which may be wireless or wired, as explained at the beginning. Advantageously, the sensors 10 to 14 may be supplied with power by said recording unit 15. Whilst said recording unit 15 may itself be powered by the construction machine 1.

As FIG. 3 shows, the recording unit 15 transmits the gathered sensor data or the sensor-recorded status information and/or data, parameters, characteristic values and similar derived therefrom to the central unit 16 as explained at the beginning, which determines the remaining service life and the actual state of the construction machine 1, in particular of the monitored transmissions 2 and 3, on the basis of the transmitted state information and/or other variables transmitted by the recording unit 15.

Advantageously, the memory unit 17 connected to the central unit stores both the state information and/or possibly pre-processed data such as characteristics, etc., transmitted by the recording unit 15 to the central unit 16, and also the remaining service life determined by the central unit 16 and the determined actual state. Advantageously, said memory unit 17 also stores a corresponding data history.

As shown in FIG. 3, a display device 18 comprising a visualization unit 19 is connected to both said memory unit 17 and said central unit 16 to display or visualize the information obtained by said central unit 16 and information stored in said memory unit 17.

Figure 4:
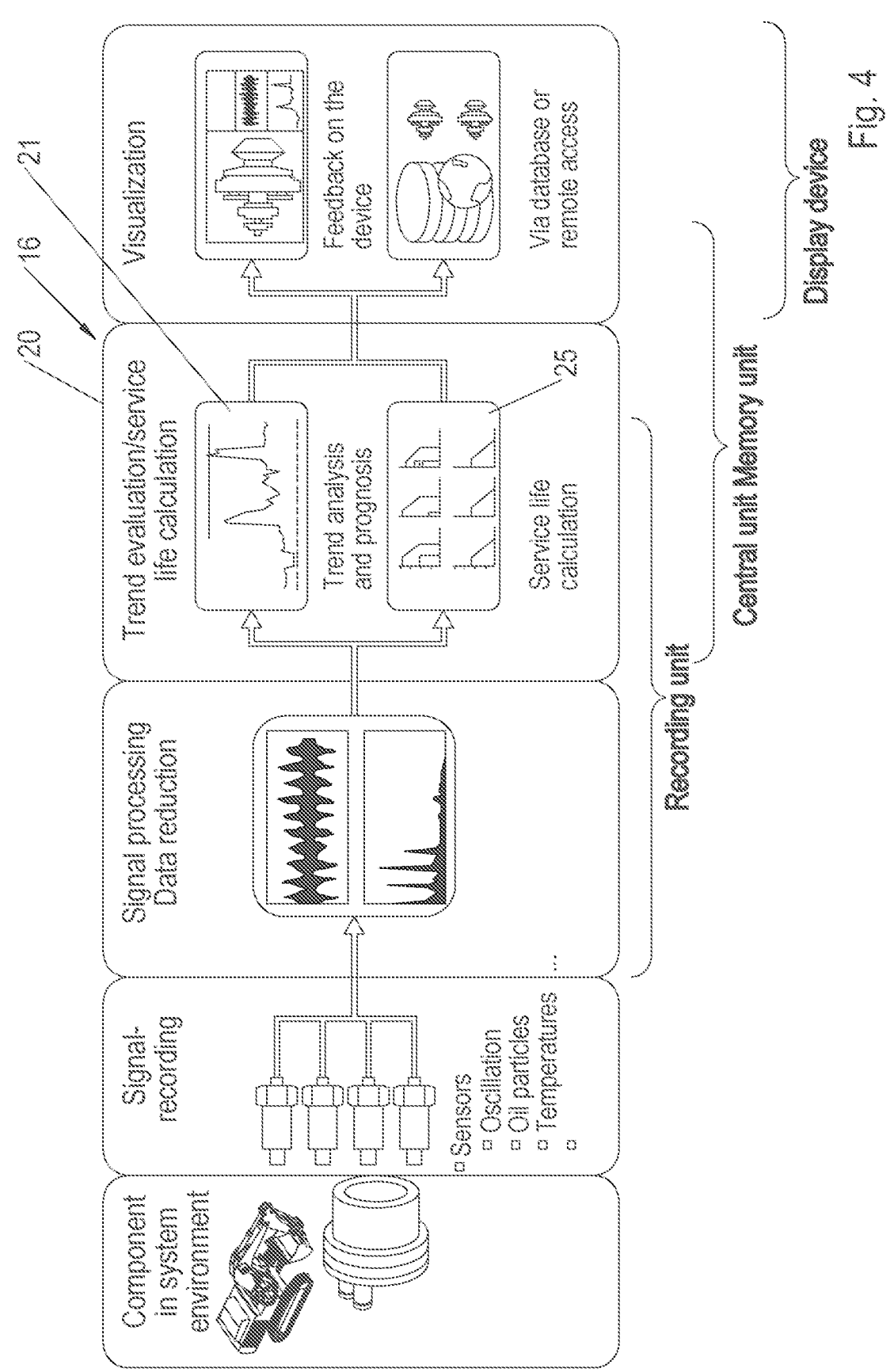
FIG. 4: A schematic data flow diagram illustrating the data flow and processing of the recorded state information from its sensory detection on the construction machine transmission to the display of the actual state and the remaining service life on a display.

Advantageously, the processing and evaluation of the sensor-recorded state information can be performed in two stages. On the one hand, as FIG. 4 shows, pre-processing and/or reduction of the state information recorded by sensors can be carried out by the recording unit 15 in order to transmit the compressed and/or reduced and/or pre-processed information to the central unit 16. If necessary, said recording unit 15 may also already perform further analysis and/or evaluation steps, as explained at the beginning.

In this respect, said recording unit 15 may form a data processing device which may comprise one or more processors and one or more memories in which program blocks are stored which are processed by the processors.

The central unit 16, which may be designed as a server and/or may comprise one or a plurality of processors and one or a plurality of memory devices in order to process program blocks in a corresponding manner, may further analyze and evaluate the state information gathered by the recording unit 15 and/or preprocessed, compressed and/or reduced data transmitted by the recording unit 15 in order to determine the actual state and the remaining service life of the construction machine 1 or its transmissions 2 and 3.

For this purpose, the central unit 16 may comprise an analysis module 20 which analyses the information transmitted by the recording unit 15, possibly together with further information transmitted to the central unit 16 and its analysis module 20 from the memory unit 17.

In particular, the central unit 16 may comprise a trend determination component 21 for determining a trend from said information, as explained at the beginning, cf. FIG. 4.

In addition to said trend determination, a comparison device 22 implemented in the central unit 16 may compare the transmitted data or information with threshold values and/or range limits, as already explained. A weighting device 23 may give different weights and relevance to different state information and/or different trends and/or different threshold deviations, which are considered for determining the actual state and the remaining time.

The dynamic determination device 24 may dynamically change calculation factors and/or thresholds and/or weights, as discussed earlier.

The remaining service life calculation unit 25 of the central unit 16 then calculates the remaining service life of the monitored component based on the information and the data, trends and weightings derived therefrom based on calculation models.

As FIG. 4 further shows, the determined variables actual state and remaining service life as well as further information of interest such as current state information or derived intermediate evaluations are displayed by the display device 18 on a display 26, which can be provided at the driver's cab 6, although further displays 26 can also be provided at the machine manufacturer or machine operator.

Figure 5:
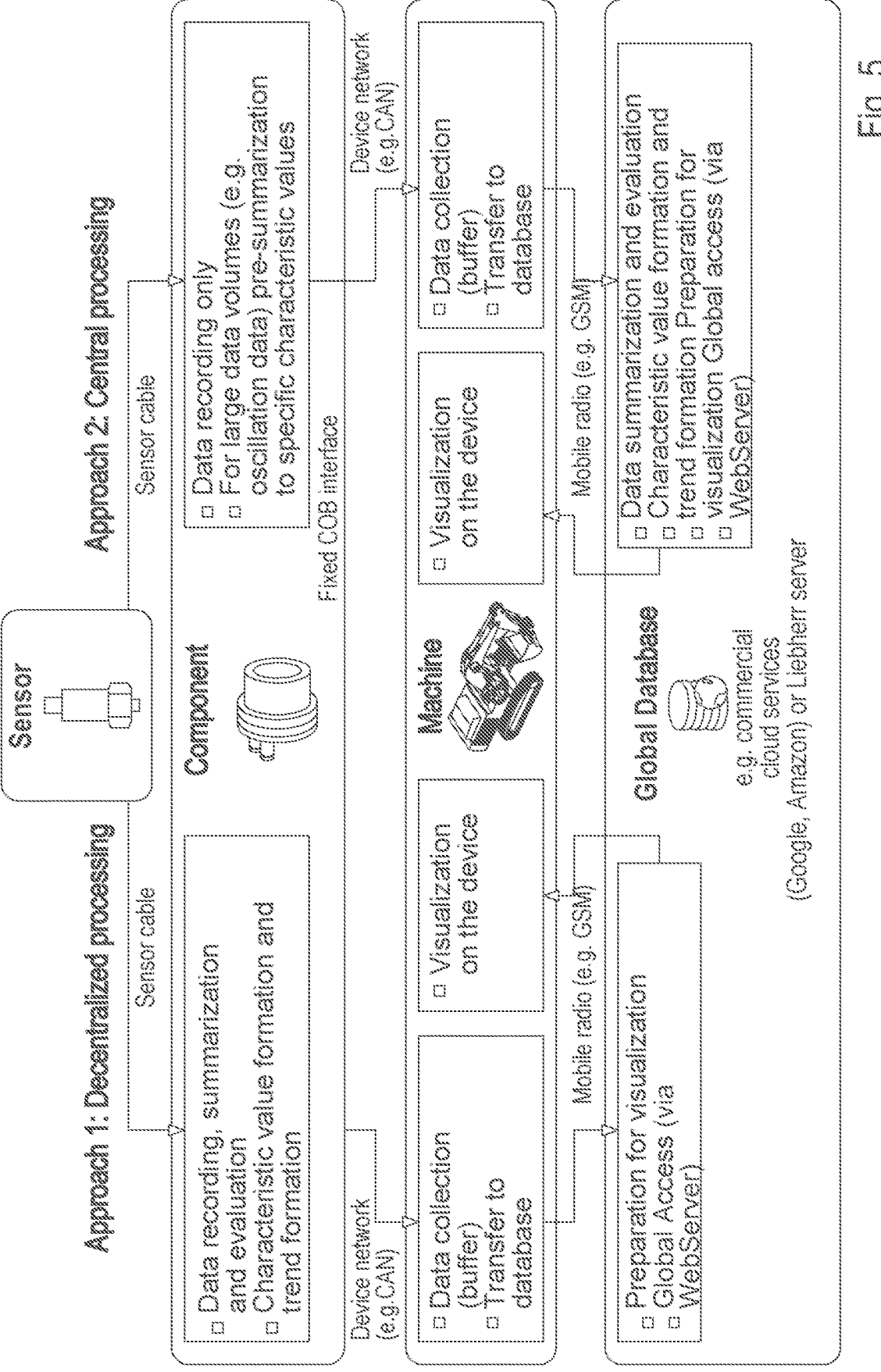
FIG. 5: A schematic representation of the processing steps relating to the state data recorded by the sensors on the transmission up to the display of the determined remaining service life, whereby decentralised data processing on the one hand and central processing on the other hand are shown.

As FIG. 5 shows, the state information recorded by sensors on the construction machine 1 can be processed decentrally or centrally.

Whereas in the case of central processing at the sensor-monitored component such as, for example, the transmission 3, only data recording and, if necessary, in the case of large data quantities, a pre-compression takes place and at the construction machine 1 only a data collection takes place, in particular in the recording unit 15, in the case of decentral processing, in addition at the component, for example in the form of the transmission 3, and/or at the construction machine 1, a pre-evaluation and/or evaluation of the sensor data, for example a characteristic value formation and trend formation, can take place, in particular via the recording unit 15 provided at the construction machine and/or the central unit 16 provided at the construction machine or on site at the construction site.

In the case of central processing, data compression and evaluation, formation of characteristic values and trends, preparation for visualization and provision of global access, for example via web services, are then carried out centrally, for example by a central server in which the central unit 16 is implemented. Conversely, with decentralized processing, since the processing has already been carried out decentrally, only the preparation for the visualization is carried out centrally and global access is provided.

Figure 6:
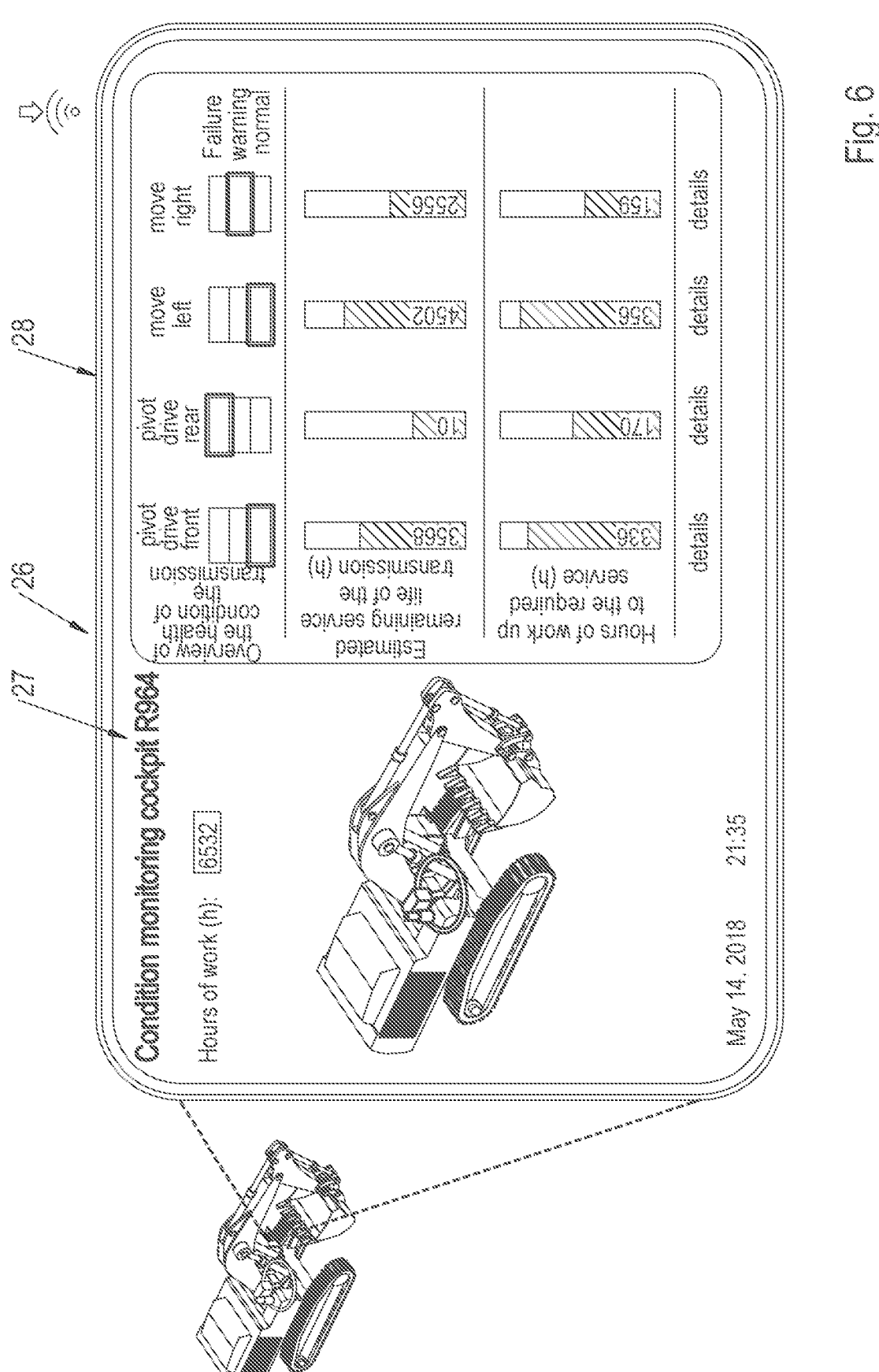
FIG. 6: a schematic representation of the display of the determined actual state, the determined remaining service life and the determined time remaining until a required service on the display device of the construction machine.
Figure 7:
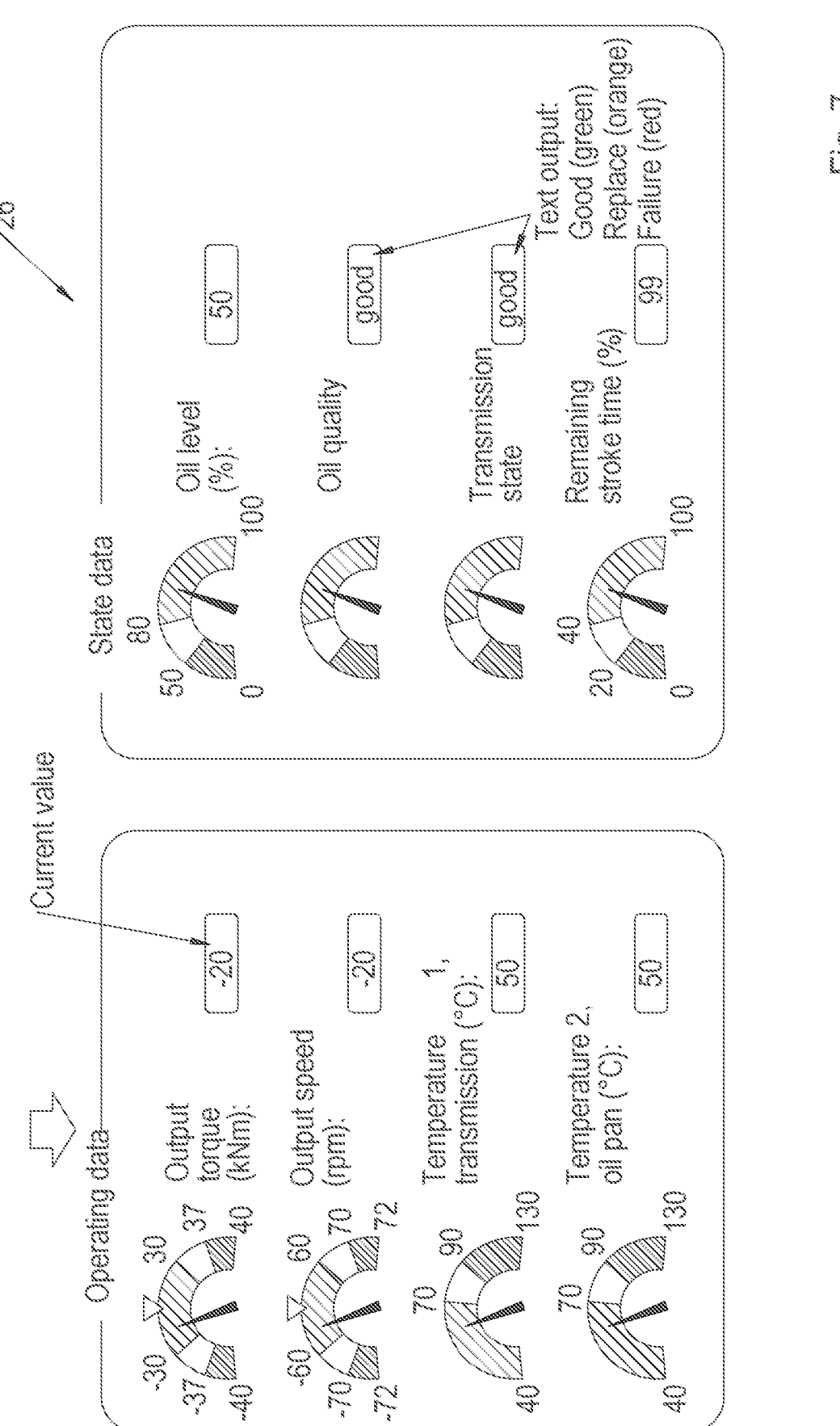
FIG. 7: A schematic representation of the display of currently recorded state information and the determined actual state and the determined remaining service life of oil and transmission of the construction machine from the preceding figures.

As FIG. 6 shows, the display 26 representing the information recorded and/or determined may advantageously comprise a split-screen display similar to a split-screen, so that in a display field 27 the construction machine 1 and the components, in particular transmissions 2 and 3 are shown, to which the representation of the recorded and/or determined information relates. In the further display field 28, the determined information, in particular the determined actual state, the determined remaining service life and the remaining interval to the next required service are displayed, advantageously in each case in the form of a step or bar chart and/or a filling strip chart. Alternatively or additionally, the determined information is displayed in the display field 28 in a traffic light representation, for example by means of the intuitively detectable traffic light color symbolism "Green=okay", "Yellow=conditionally okay/trending towards critical" and "Red=critical/problem".

We claim:

1. A device for determining the actual state and/or the remaining service life of a construction, materials-handling and/or conveyor machine, the device comprising:

a plurality of sensors on the construction, materials-handling and/or conveyor machine for recording various state information, wherein the plurality of sensors are integrated in an interior of a transmission of the construction, materials-handling and/or conveyor machine, wherein the plurality of sensors comprises various sensor types for recording at least two different categories of information from the group comprising component oscillations, lubricant properties, component and/or lubricant temperature and drive loading, wherein the plurality of sensors comprises an oscillation sensor for detecting component oscillations and at least one of the following sensors: an oil particle sensor, an oil viscosity sensor, an oil conductivity sensor for detecting transmission oil particles and/or transmission oil condition, a recording unit connected to the plurality of sensors for gathering recorded state information, a central unit connectable to the recording unit for evaluating gathered state information and for determining the actual state and/or the remaining service life from the gathered state information, wherein the actual state and/or the remaining service life is determinable by the central unit based on the at least two different categories of information, and a display device for displaying the actual state determined by the central unit and/or the remaining service life determined by the central unit, wherein the display device is provided on the construction, materials-handling and/or conveyor machine and is configured to display gathered state information and the actual state and/or the remaining service life to a control station, wherein the display device is configured to be touch-sensitive as a touch screen, wherein the display device comprises a control device of the control station such that upon touching an area of the display device in which a specific machine component of the construction, materials-handling and/or conveyor machine is displayed, the control device is configured to reconfigure the display device, wherein the central unit comprises a weighting device for differentially weighting different gathered state information and/or different information derived therefrom, wherein the actual state and/or the remaining service life is determinable by the central unit based on weightings of the different gathered state information and/or the different information derived therefrom, wherein the weighting device is configured to give a different weighting to an oscillation signal of the oscillation sensor and/or an oscillation characteristic value derived therefrom than to a temperature value of a temperature sensor and/or a temperature characteristic value derived therefrom, and/or is configured to give a different weighting to speed and/or torque information of a speed and/or torque sensor and/or a speed and/or torque characteristic value derived therefrom than to oil condition information of the oil particle sensor, wherein if a recorded state information item exceeds a predetermined threshold value, but all other state information items are below their respective threshold values, the central unit regards the exceeding of the predetermined threshold value as unproblematic, and if three recorded state information items are beyond their respective threshold values, a maintenance signal is triggerable via the central unit.

2. The device of claim 1, wherein the plurality of sensors further comprises at least one of the following sensors: the speed and/or torque sensor, the temperature sensor, an oil condition sensor, a force sensor, an oil level sensor, a dielectricity sensor and a moisture sensor.

3. The device of claim 1, wherein the plurality of sensors are enclosed by a housing of the transmission.

4. The device of claim 1, wherein the plurality of sensors are jointly powered by the recording unit.

5. The device of claim 1, wherein the central unit is configured to take into account all state information of the following sensors: the speed and/or torque sensor, the oscillation sensor, an oil temperature sensor, the oil particle sensor, the oil viscosity sensor, the oil conductivity sensor, a force sensor, an oil level sensor, a dielectricity sensor and a moisture sensor.

6. The device of claim 1, wherein the plurality of sensors further comprises at least one of the following sensors: a torque and/or a rotational speed sensor, an oil temperature sensor, a force sensor, an oil level sensor, a dielectricity sensor and a moisture sensor, and wherein the actual state and/or the remaining service life of the construction, materials-handling and/or conveyor machine and/or of the transmission is determinable by the central unit based on at least two items of information from the group comprising transmission rotational speed and/or torque, oscillations, transmission oil temperature, transmission oil particles and oil condition.

7. The device of claim 1, wherein the transmission is a slewing transmission for slewing a revolving stage of the construction, materials-handling and/or conveyor machine relative to an undercarriage of the construction, materials-handling and/or conveyor machine, or wherein the transmission is a travel drive transmission for driving a travel drive or a wheel drive.

8. The device of claim 1, wherein the recording unit comprises a data processing module for pre-compressing and/or classifying the gathered state information and is configured to transmit pre-compressed and/or classified state information to the central unit.

9. The device of claim 8, wherein the recording unit comprises an oscillation analysis module for analyzing the state information of the oscillation sensor and for determining oscillation spectra and/or characteristic oscillation values, and wherein the actual state and/or the remaining service life is determinable by the central unit based on determined oscillation spectra and/or determined characteristic oscillation values transmitted from the recording unit.

10. The device of claim 1, wherein the recording unit comprises a linking and/or accounting module for linking and/or accounting for the gathered state information, and wherein the linking and/or accounting module is configured to:

determine temperature differences from gathered temperature values of a temperature sensor, and/or calculate a transmission and/or drive power from speed and/or torque values of the speed and/or torque sensor, and/or calculate an output or input torque from a torque value of a torque sensor using gear ratio information and an efficiency map.

11. The device of claim 1, wherein the recording unit has a power supply input connected to the construction, materials-handling and/or conveyor machine and a power supply output connected to the plurality of sensors.

12. The device of claim 1, wherein the central unit comprises an analysis module for analyzing the gathered state information and for analyzing pre-processed state information transmitted by the recording unit.

13. The device of claim 12, wherein the analysis module is configured to determine the actual state and/or the remaining service life of a transmission of the construction, materials-handling and/or conveyor machine based on oscillation spectra transmitted by the recording unit and/or characteristic oscillation values and/or temperature differences transmitted by the recording unit and/or power values determined by the recording unit and/or output and/or input torques determined by the recording unit.

14. The device of claim 12, wherein the central unit comprises a trend determination module for determining a trend characterizing a course of changes of the gathered state information and/or information derived therefrom and predicting a future course, and wherein the actual state and/or the remaining service life is determinable by the central unit based on the trend.

15. The device of claim 14, wherein the trend determination module is configured to extrapolate a function approximating the course of changes in the gathered state information and/or the information derived therefrom, and to determine a future trend from the extrapolated course of the function.

16. The device of claim 1, wherein the central unit comprises a comparison device for comparing the gathered state information and/or information derived therefrom with limit values and/or with predetermined ranges, and wherein the central unit is configured to determine the remaining service life of the construction, materials-handling and/or conveyor machine from the distance of the actual values of the gathered state information and/or the information derived therefrom from the limit values and/or the predetermined ranges.

17. The device of claim 1, wherein the weighting device is configured to give different weightings to different state information of different sensors of the plurality of sensors and/or different information derived therefrom based on trends determined for the different state information and/or the different information derived therefrom.

18. The device of claim 1, wherein the central unit comprises a dynamic assessment device for dynamically assessing deviations of the gathered state information from an associated threshold value and/or from a historical course of the gathered state information, and wherein the dynamic assessment device is configured to dynamically adjust deviation threshold values based on a number of gathered state information and/or information derived therefrom with deviations from threshold values.

19. The device of claim 1, wherein the central unit is configured to take into account a history of the gathered state information and/or information derived therefrom for determining the actual state and/or the remaining service life.

20. The device of claim 19, wherein the history comprises at least one of the following histories: a history of gathered temperature values, a history of gathered oscillation characteristics, a history of gathered torque and/or speed values, and a history of gathered oil condition and/or particle values.

21. The device of claim 1, wherein the display device comprises at least one display on the construction, materials-handling and/or conveyor machine.

22. The device of claim 1, wherein the display device comprises at least one display at a machine manufacturer and/or one display at a machine operator.

23. The device of claim 1, wherein the display device comprises at least one display on which a first display field and a second display field separate from the first display field are displayable, wherein a representation of the construction, materials-handling and/or conveyor machine and machine components of the construction, materials-handling and/or conveyor machine monitored by the plurality of sensors is displayable in the first display field, and wherein a graphical representation of the actual state and the remaining service life of the machine components displayable in the first display field is displayable in the second display field.

24. The device of claim 23, wherein at least the first display field is configured to be touch-sensitive as a touch screen wherein the control device is configured to reconfigure the second display field to display in the second display field the actual state and the remaining service life of the specific machine component displayed in the first display field.

25. The device of claim 1, wherein the central unit is configured to provide a warning signal and/or a maintenance signal upon or after determining a remaining service life below a predetermined time period.

26. The device of claim 1, wherein the central unit is permanently or temporarily connected to the recording unit by a wired or wireless connection.

27. The device of claim 1, wherein the central unit is located directly on the construction, materials-handling and/or conveyor machine or is installed at a location in the form of a central server or a cloud.

28. The device of claim 1, wherein a processing or a partial processing of a remaining service life calculation, trend formation and/or limit value monitoring is decentrally performed in the recording unit or is performed in the central unit.

29. The device of claim 1, wherein the central unit and memory units are permanently or temporarily wired or wirelessly connected to a visualization unit.

* * * * *